United States Patent [19]
Gascuel et al.

[11] Patent Number: 5,093,672
[45] Date of Patent: Mar. 3, 1992

[54] WRITING INSTRUMENT

[75] Inventors: Yves J. Gascuel, Verriebes Le Buisson; Jean-Pierre Cointre, Le Plessis Trevise, both of France

[73] Assignee: Océ Graphics France S.A., Cedex, France

[21] Appl. No.: 666,105

[22] Filed: Mar. 7, 1991

Related U.S. Application Data

[63] Continuation of Ser. No. 369,968, Jun. 22, 1989.

[30] Foreign Application Priority Data

Jun. 30, 1988 [FR] France .............................. 88 08803

[51] Int. Cl.[5] ..................... G01D 15/16; B43C 13/00
[52] U.S. Cl. .................... 346/139 R; 346/49; 33/18.1
[58] Field of Search ............... 346/49, 139 R; 33/18.1

[56] References Cited

U.S. PATENT DOCUMENTS

| | | | |
|---|---|---|---|
| 4,274,102 | 6/1981 | Lum | 346/139 R |
| 4,677,572 | 6/1987 | Gunderson et al. | 346/139 R X |
| 4,849,771 | 10/1988 | Lawrence et al. | 346/139 R |

FOREIGN PATENT DOCUMENTS 2572572  2/1986  France .
62-188653(A) 8/1987 Japan .

Primary Examiner—Benjamin R. Fuller
Assistant Examiner—Gerald E. Preston
Attorney, Agent, or Firm—Lowe, Price, LeBlanc & Becker

[57]  ABSTRACT

This device relates to graphics apparatus of the pen-plotter type comprising a plotter head which is moveable in a horizontal direction Y and supports a writing instrument which is vertically moveable (Z direction) on the head. Each writing instrument bears an identification surface the location of which along the Z direction depends on the instrument type. The apparatus further includes a fixed abutment. The instrument type is identified by detecting the vertical position of the instrument when the identification surface is brought into contact with the abutment. For greater accuracy, a differential measurement can be obtained between this vertical position and a reference position obtained by bringing a reference surface of the instrument into contact with a reference abutment.

6 Claims, 2 Drawing Sheets

WRITING INSTRUMENT

This application is a continuation of application Ser. No. 07/369,968 filed June 22, 1989, pending.

The invention relates to plotter-type graphics systems and more particularly to a process and device for identifying a writing instrument used in such graphics systems.

BACKGROUND OF THE INVENTION

Plotter-type graphics systems generally include a plotter head bearing a writing instrument that is displaceable on a print medium to trace graphic patterns thereon. In the so-called horizontal plotters, the print medium is fixed and the writing head is displaceable over the medium along two rectangular axes. In other plotters, the print medium is moveable in an X-direction and the writing head is moveable in a Y-direction, perpendicular to the X-direction. The writing instrument is further displaceable in a Z direction, perpendicular to the print medium, between a work position contacting the print medium and a position displaced from the medium. The writing instrument used is selected among a set of writing instruments stored in a storage device, such as a barrel for example. Several writing instruments, e.g. having different colours or thicknesses, can thus be used for a same drawing.

It is important to know at any moment which writing instrument is mounted on the head. On the one hand it is required to modify such plotting parameters as speed, acceleration or applied pressure, depending on the type of writing instrument used, e.g. whether it is a fibre-tip, ballpoint or tube-point; on the other hand, it may be useful to check whether the writing instrument carried on the head corresponds to the one intended to be used.

A known identification procedure consists in picking out the different writing instruments in terms of the positions they occupy in the storage device, the instrument type being stored in a memory within the machine by an operator when the different instruments are loaded into the storage device. Another known identification procedure consists in placing optical references on the writing instruments, such as reflecting annular strips whose width and location depend on the type of instrument. The type of instrument picked by the plotter head is then determined by detecting the width and location of these strips by means of an optical transmitter-receiver. This system has the drawback of being sensitive to ambient light and to dust that can darken the reflecting strips. The reflecting strips can be damaged when changing instruments, and the system requires purpose-designed detection equipment that can be difficult to adjust. In other systems, identification of the instrument type is obtained by identification of the barrel, which prohibits having an assortment of several types of instrument in a common barrel.

SUMMARY OF THE INVENTION

The subject of the invention is a process and device for automatically detecting writing instrument types without any of the above drawbacks. The invention has the additional advantage of not requiring a detection device other than the position detector normally used to indicate the position of the writing instrument with respect to the plotter head, the said detector serving to control the instrument's downward travel onto the print medium.

According to the invention, a process for the identification of a writing instrument in a graphics apparatus comprising a plotter head displaceable along at least a first direction (Y) parallel to a print medium to trace predetermined graphics patterns on the print medium, the writing instrument borne by the plotting head being furthermore displaceable along a second direction (Z) substantially perpendicular to the first so as to move away from, or approach the print medium, is characterized in that, with one of the first and second directions being chosen as the detection direction, the writing instrument bears an identification surface whose location along the detection direction is determined as a function of the type of writing instrument. The process further includes the following steps: bringing the writing instrument to an identification position for which the identification surface of the writing instrument is in contact with an identification abutment of the graphics apparatus; and detecting the identification position of the writing instrument along the said detection direction so as to deduce therefrom an indication on the type of writing instrument borne by the head.

Preferably, a differential measurement is carried out by bringing the writing instrument up to a reference position for which a reference position of the writing instrument, whose location is independent of the instrument type, is in contact with a reference abutment on the graphics apparatus; detecting the reference position along said detection direction; and subsequently combining the identification position and the reference position to deduce therefrom an indication of the type or writing instrument.

According to another aspect of the invention, a graphics apparatus is composed of a plotter head mounted to be moveable on a frame along at least a first direction (Y) and bearing a writing instrument so as to trace predetermined graphic patterns on a print medium; means for mounting the writing instrument on the plotter head to allow movement of the writing instrument with respect to the plotter head along a second direction (Z) that is substantially perpendicular to the first direction so as to move away from or approach the print medium; first actuating means to displace the plotter head along a first direction (Y); and second actuating means to displace the writing instrument with respect to the plotter head along the second direction (Z). With one of the first and second directions chosen as the detection direction, the writing instrument bears an identification surface whose location along said detection direction is determined as a function of the type of writing instrument, and the graphics apparatus includes an identification abutment, means for controlling the actuating means in order to bring the plotter head into an identification position for which the identification surface is in contact with the identification abutment, and means for detecting the position of the writing instrument along the detection direction in order to deduce from the detected position an indication of the type of writing instrument borne by the head.

BRIEF DESCRIPTION OF THE DRAWINGS

The features and advantages of the invention will become apparent from the following description given as a non-limiting example, with reference to the accompanying drawings in which.

DETAILED DESCRIPTION OF THE PREFERRED EMBODIMENT

Figure 1:
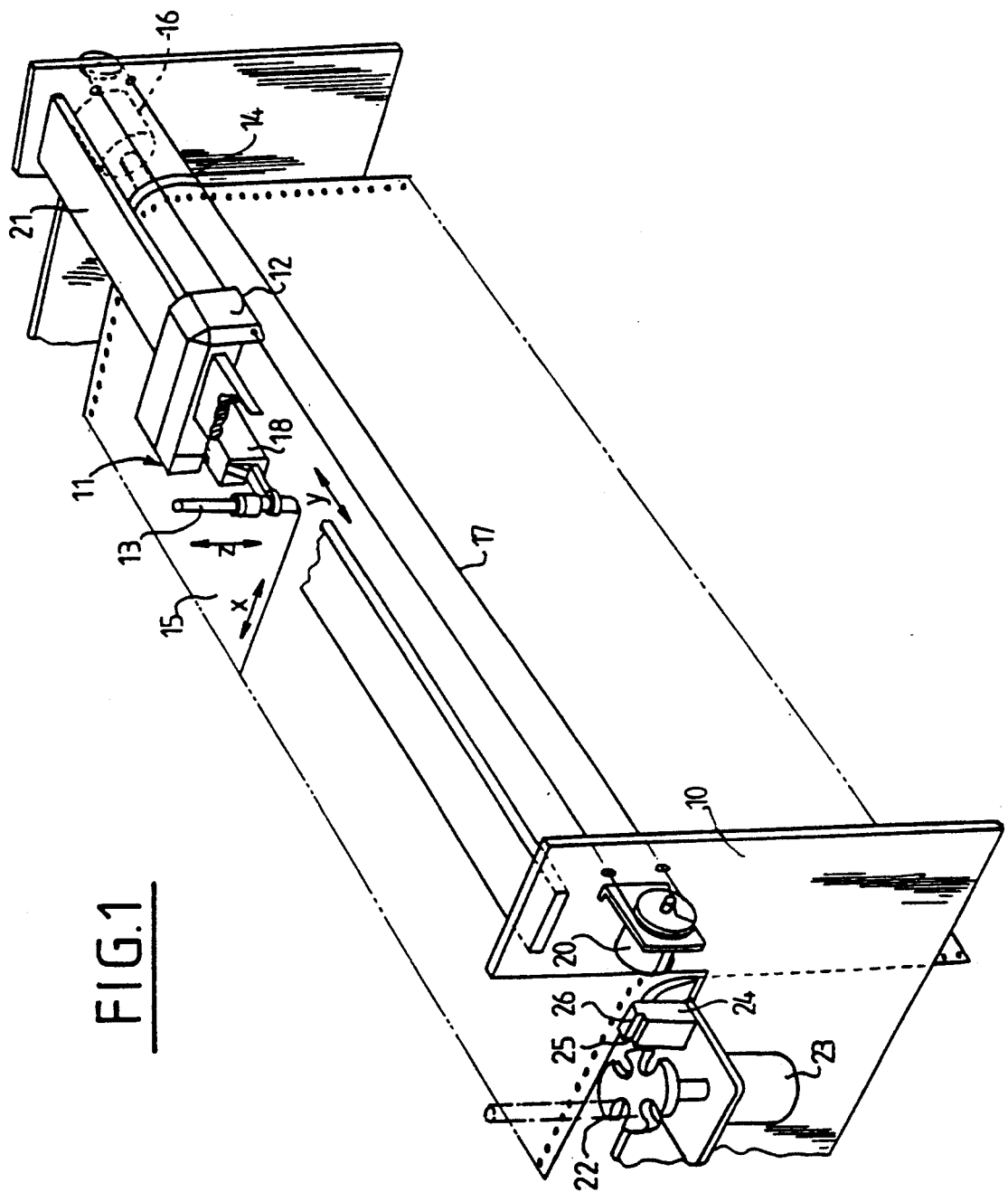
FIG. 1 is a highly schematical general view of an X Y plotter type graphics apparatus.

FIG. 1 shows schematically a part of the plotting apparatus consisting of a frame 10 on which is moveably mounted a plotter head 11 formed by a slide-rest 12 supporting a writing instrument 13 via mounting means 18. A drum 14 over which passes a print medium such as a sheet of paper 15 is rotatably mounted on the frame 10.

The drum 14 is driven into rotation by means of a motor 16 whose output shaft is e.g. directly coupled to the axis of the drum 14. Drum rotation along one direction or another causes a forward or backward longitudinal displacement of the sheet 15 along a direction X. Fixed contact between the drum 14 and the sheet 15 is obtained e.g. by means of pins on the drum cooperating with perforations formed alongside the edges of the sheet, or by means of pressure rollers pressing the sheet against the drum.

The plotter head 11 is moveable in translation along a horizontal transversal direction Y, parallel to the axis of the drum 14 and perpendicular to the X direction. To that end, the slide-rest 12 is joined to a ribbon, or cable 17 e.g. drawn in one direction or another by a motor 20. During its displacement, the slide-rest 12 is guided along one or several slideways 21.

The writing instrument 13 is mounted on the slide-rest 12 so as to be moveable in a Z direction perpendicular to X and Y between a proximal position on the sheet 15 (low position) in which the tip of the writing instrument is in contact with the sheet 15, and a distal position (high position) in which the tip of the writing instrument is not in contact with the sheet 15. In the low position, the writing instrument is in contact with the sheet 15 at a writing zone located parallel and close to the upper generatrix of the drum 14, or along that generatrix. Various actuating means may be used to transfer the writing instrument from its high position to its low position, or vice versa. A particular embodiment of these actuating means is described further with reference to FIG. 2.

Finally, FIG. 1 also shows—very schematically—a rotary magazine or barrel 22 at the peripheral portions of which are formed several lodgings for storing writing instruments, so as to allow automatic changeover of the writing instrument carried by the head. The changeover is carried out by bringing the plotter head 11 to a transfer position adjacent to the barrel 22, this position corresponding to one end of travel of the plotting head. The barrel 22 is rotatably moveable in cooperation with a motor 23 in order to confront the plotting head, in a changeover position, with either a vacant lodging for receiving the instrument carried by the head, or a lodging occupied by an instrument to be transferred to the head.

An element 24 is fixed to the frame close to the barrel 22 and in the extension of the writing path. Its upper portion has a reference abutment surface 25 and an identification abutment surface 26 against which the writing instrument 13 can be brought into contact. The purpose of these abutments shall be explained in more detail further.

Figure 2:
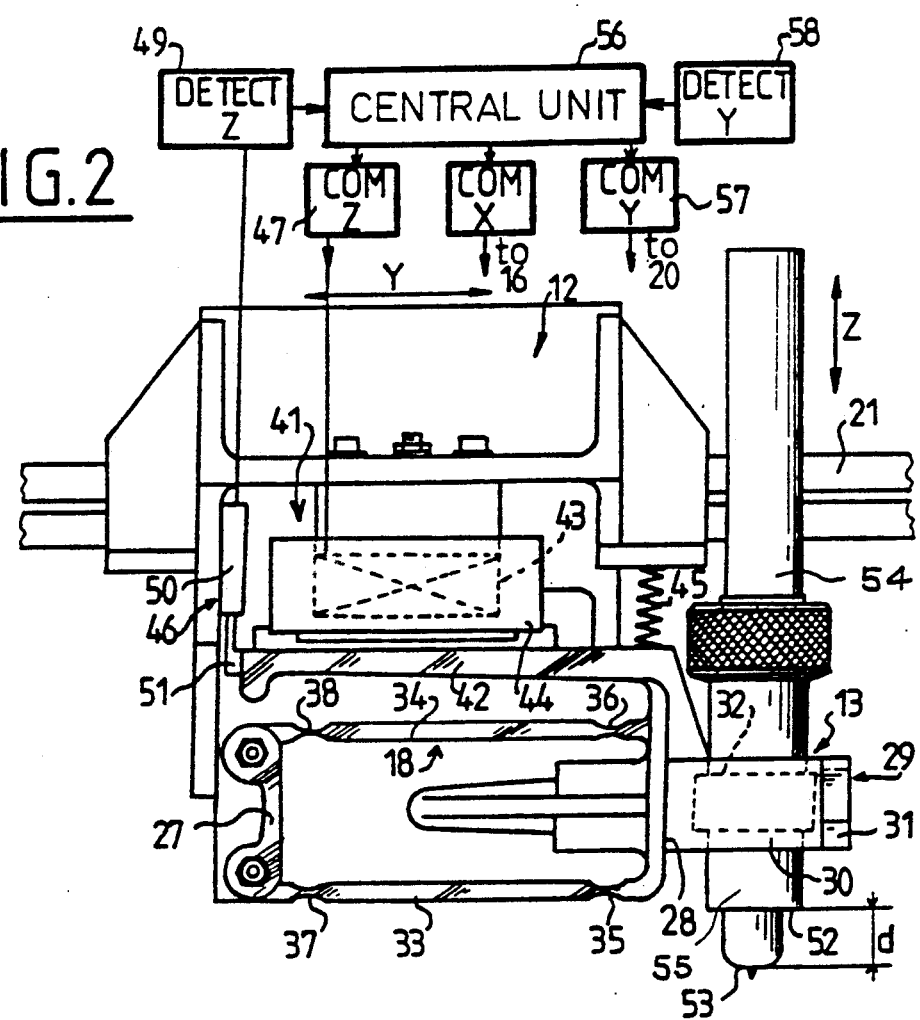
FIG. 2 is a more detailed view showing the plotter head of the graphics apparatus shown in FIG. 1.

The plotting head carrying a writing instrument 13 is shown in more detail in FIG. 2.

The mounting means 18 consist of a rear portion 27 fixed to the slide-rest 12 and a front portion 28 that is adapted to receive the writing instrument and moveably mounted in the Z direction with respect to the slide 12. The writing instrument 13 is held on the front portion 28 of the mounting means by means of a clamp 29 which is affixed to this portion. The clamp 29 comprises a fixed jaw 30 which is unitary with the front portion 28 of the mounting means 18, and a jaw 31 which is articulated on this front portion around a vertical axis and pushed back by a spring (not shown) to clamp the writing instrument 13 on either side of a ring 32 formed on the said writing instrument for secure fastening of the latter throughout the writing operations. The mounting means 18 also include linkages 33 and 34 affixed to the front portion 28 by shrunken portions 35 and 36, and to the rear portion by shrunken portions 37 and 38.

In the illustrated example, raising and lowering movements of the writing instruments along the Z direction are obtained through reversible deformations of the mounting means 18, as described in French patent application No. 87.05116. In brief, portions 27 and 28 and linkages 33 and 34 are made from a single piece, e.g. by moulding of a plastics material such as polypropylene in the shape of an elastically-deformable parallelogram. The structure's capacity for deformation is achieved through the shrunken portions 35 to 38 in the linkages 33,34 that connect the front portion 28 supporting the clamp 29 to the rear portion 27 that is rigidly fixed to the slide-rest 12.

Lowering and raising movements of the writing instrument 13 are caused by an actuator 41 acting directly on an arm 42 that is unitary with the front portion 28 of the mounting means. The actuator 41 can e.g. be of the electromagnetic type operating with an assembly 43 supported by the slide-rest 12 and formed of a flat soft-iron element on which are fixed two permanent magnets, and a vertically-moveable coil 44 inside the field created by the assembly 43 in response to a current applied to the coil from a control device 47. The coil 44 is unitary with the arm 42 and, depending on the direction of the current flowing therethrough, is either displaced towards the bottom to deform the mounting means so as to bring the writing instrument 13 to a low position, or towards the top to bring the writing instrument to a raised position. A draw-spring 45 exerts a restoring force on the front portion 28 of the mounting means to bring back the writing instrument to the raised position when the apparatus is not powered. Insofar as the spring 45 is chosen so that it just balances the weight of the moveable assembly supporting the instrument, and so that it does not act during a writing process, it is preferable to use the actuator 41 acted upon by controller 47 to bring the writing instrument to a raised position. This will ensure a fast and accurate raising of the instrument.

The plotter head 11 further includes a position detector 46 for detecting the position of the writing instrument 13 in the Z direction. The detector is composed of a fixed part 50 which is unitary with the slide-rest 12 and a moveable part 51 which is unitary with the arm 42 and can be an optical encoder having a coded track affixed to the moveable part 51, whose position along the Z direction is supplied in the form of an electrical signal from an optical sensor contained in the fixed part 50 by means of a detection circuit 49.

The control circuit 47 and detection circuit 49 are connected to a microprocessor-based central unit 59 programmed for their operation.

The central unit 56 is also connected to a controller 57 connected to a motor 20 (FIG. 1) for controlling the drive along the Y direction. The motor 20 can e.g. be a DC motor cooperating with an encoder (not shown) mounted on the pulley for drawing the cable 17. The Y position of the slide-rest is thus detected and sent in electrical signal form to the central unit via a detection circuit 58. The central unit is similarly connected to a controller 60 connected to motor 16 for controlling the movement of the print medium along the X direction.

Clearly, other embodiments for the plotter head may be used so long as they allow displacement of the writing instrument along the Y and Z directions. For example, another embodiment of the plotter head is described in French patent No. 2572572 (BENSON). In other plotter heads, the writing instrument is fixed to the end of a support pivoting about a horizontal axis so that the displacement along the Z direction follows a circular arc close to the vertical.

In view of identifying the type of instrument, the writing instrument 13 possesses a shoulder having an identification surface 52 whose location along the Z direction depends on the type of instrument. In other words, the distance between the identification surface 52 and the ring 32, differs according to the instrument. The writing instrument 13 also has a reference surface 53 located e.g. close to the tip of the writing instrument. The location of the reference surface 52 along the Z direction is accurately determined with respect to the ring 32, irrespective of the writing instrument used. In the example described, the writing instrument is formed of two parts: the writing device per se 54 and an instrument-holder 55. The writing device is placed in the instrument-holder and held in its lodging by means of a knurled ring which has the effect of tightening the split upper part of the said instrument-holder 55 around the writing device 54. In this example, it is the instrument-holder 55 that is fitted with surfaces 52 and 53 as well as the ring 32. Clearly, the instrument holder 55 can be made an integral part of the writing device 54, the body of the latter being made by moulding with an appropriate shoulder and ring.

Figure 3A:
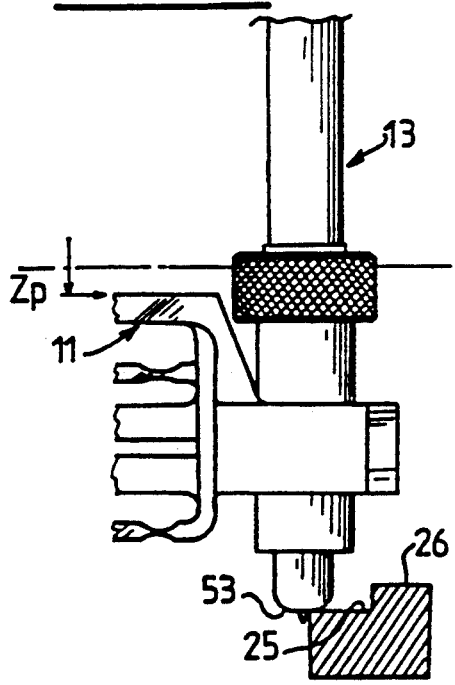
FIGS. 3a and 3b are partial detailed views showing the writing instrument in several positions adopted in the identification process according to the invention.
Figure 3B:
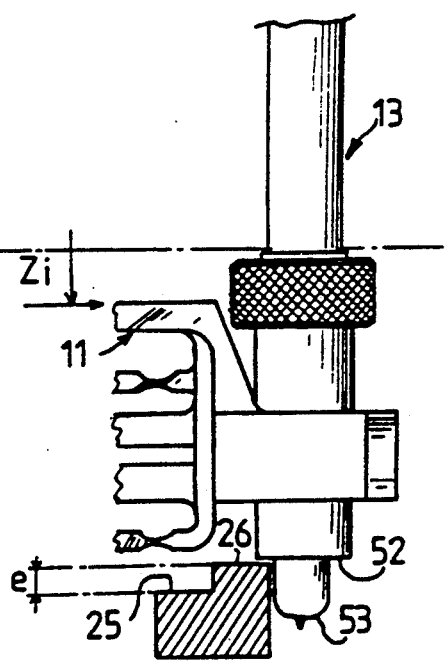

The process for identifying the type of instrument held by the head is as follows. As was previously explained, each type of instrument has its surface 52 located at a different distance from the ring 32. With the writing instrument in a raised position, the plotter head 11 is displaced along the Y direction up to the point where the identification surface 52 faces the identification abutment 26. The writing instrument 13 is lowered by means of actuating device 41 until reference surface 52 comes into contact with the abutment 26 (FIG. 3b), this position being termed the identification position. A measurement of this identification position $Z_i$ is then made along the Z direction by means of detector 46. The position $Z_i$ is representative of the type of writing instrument. For extra precaution, a differential measurement is made. This is achieved by displacing the plotting head once more to where the reference surface 53 faces the reference abutment 25. The writing instrument 13 is then lowered along the Z direction until the reference surface 53 contacts the reference abutment 25 in the reference position shown in FIG. 3a. This reference position $Z_r$ is then measured along the Z axis by means of detector 46, and a calculation is made of the difference ($Z_i - Z_r$). This calculation is performed in the central unit 56 after storing the $Z_i$ and $Z_r$ values. Defining the distance between surfaces 52 and 53 d, and the distance between abutments 25 and 26 e, it can be seen that:

$$Z_i - Z_r = d - e$$

By producing the two abutments 25 and 26 on the same element, distance e is defined with precision and $Z_i - Z_r$ gives a precise value for d. It then becomes possible to identify a large number of instrument types using a relatively short travel. In a classical type of drawing apparatus, it was found possible to detect seven different types of instruments with a travel of 3.5 mm.

The detection of the reference position also serves for presence detection, making it possible to check that, after replacement of an instrument, the new instrument has been picked up by the head and held in the correct position. To do this, the central unit 56 is made to check that the reference position $Z_r$ is located between predetermined limits.

The described example shows the abutments to be fixed on the frame close to the barrel. These abutments can obviously be located at other places that are accessible by the plotter head. For example, the abutments may be provided on the barrel itself. In the Z direction, the location of the reference surface was preferably chosen so that the reference is in the region of the raised position, $Z_r$ being around 0.5 mm for example. The location of the identification abutment along the Z axis is chosen so that, for the different types of instrument, the mean $Z_i$ position is approximately centered on the center of travel of the writing instrument.

The embodiment described can naturally be subject to numerous variants without leaving the scope of the invention. For example, there can be provided writing instruments wherein a portion of the body has a diameter that is a function of the instrument type, the external surface of this portion of the body forming an identification surface. This part of the instrument body is then displaced along the Z direction to be brought in front of an identification abutment having a vertical bearing surface and the Y detector is used to measure the position of the identification position at which the writing instrument is in contact with such an identification abutment. In this solution, the operations along the Y and Z directions are inverted, the Y direction becoming the detection direction and the Z direction becoming the approach direction.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A writing instrument, suitable for use in a graphics apparatus comprising a plotter head for moveable supporting the writing instrument to trace predetermined graphics patterns therewith and means for determining a position of the writing instrument with respect to a reference provided in said apparatus, comprising:

a body longitudinally oriented along a detection direction;

a first reference surface disposed to be normal to said detection direction at a first location on said body, said first location being selected independently of a characteristic of the writing instrument; and a second reference surface also disposed to be normal to said detection direction at a second location on said body at a predetermined distance from said first reference surface, said distance being selected in correspondence with a known characteristic of said writing instrument, said first and second surfaces being provided to facilitate detection of the respective positions of said first and second surfaces with respect to said reference to facilitate a determination of said first distance for establishing said characteristic of said writing instrument thereby.

2. A writing instrument according to claim 1, wherein:

said writing instrument has a generally cylindrical form about an axis, with a first portion having a radius larger than a radius of a second portion of the body, whereby said first reference surface is defined by a shoulder between said first radius portion and said second radius portion.

3. A writing instrument according to claim 2, wherein:

said second reference surface is defined at a distal end of said second radius portion of said body of said writing instrument.

4. A writing instrument according to claim 3, wherein:

said first and second surfaces are disposed so as to facilitate respective contacts thereby with said reference by movement of the writing instrument in a direction along said axis.

5. A writing instrument, suitable for use in a graphics apparatus comprising a plotter head for movably supporting the writing instrument to trace predetermined graphics patterns therewith and means for determining a position of the writing instrument with respect to a reference provided in said apparatus, comprising:

a generally cylindrical body having an axis longitudinally oriented normal to a detection direction;

said body comprising a first portion having a first cylindrical reference surface of a first radius, said first radius being selected independently of a characteristic of the writing instrument; and a second portion comprising a second cylindrical reference surface of a second radius, said second radius being selected so that the difference between said first and second radius corresponds with a known characteristic of said writing instrument, said first and second surfaces being disposed to facilitate a determination of the respective locations of said first and second reference surfaces with respect to said reference, for determination of said radial difference and said corresponding characteristic of said writing instrument thereby.

6. A writing instrument according to claim 5, wherein:

said first and second surfaces are disposed to as to facilitate respective contacts thereby with said reference by movement of the writing instrument in a direction normal to said axis of said writing instrument.

* * * * *